(12) United States Patent
Suemichi

(10) Patent No.: US 11,959,794 B2
(45) Date of Patent: Apr. 16, 2024

(54) COMBINATION WEIGHING APPARATUS WITH A PLURALITY OF ARTICLE SUPPLIERS

(71) Applicant: Yamato Scale Co., Ltd., Hyogo (JP)

(72) Inventor: Ryo Suemichi, Hyogo (JP)

(73) Assignee: YAMATO SCALE CO., LTD., Hyogo (JP)

( * ) Notice: Subject to any disclaimer, the term of this patent is extended or adjusted under 35 U.S.C. 154(b) by 503 days.

(21) Appl. No.: 17/286,362

(22) PCT Filed: Dec. 13, 2019

(86) PCT No.: PCT/JP2019/048987
§ 371 (c)(1),
(2) Date: Apr. 16, 2021

(87) PCT Pub. No.: WO2020/129853
PCT Pub. Date: Jun. 25, 2020

(65) Prior Publication Data
US 2021/0372848 A1     Dec. 2, 2021

(30) Foreign Application Priority Data
Dec. 19, 2018   (JP) .................................. 2018-237045

(51) Int. Cl.
*G01G 19/387*     (2006.01)

(52) U.S. Cl.
CPC .................................. *G01G 19/387* (2013.01)

(58) Field of Classification Search
CPC ........................... G01G 19/387; G01G 19/393
See application file for complete search history.

(56) References Cited

U.S. PATENT DOCUMENTS

| | | | | |
|---|---|---|---|---|
| 5,054,652 A | * | 10/1991 | Oshima | G01G 13/024 222/77 |
| 5,753,867 A | * | 5/1998 | Konishi | G01G 19/393 177/25.18 |
| 6,493,605 B1 | * | 12/2002 | Prideaux | G01G 19/393 177/180 |
| 10,384,878 B2 | * | 8/2019 | Kageyama | G01G 19/393 |
| 10,408,669 B2 | * | 9/2019 | Takayanagi | G01G 11/14 |
| 11,261,033 B2 | * | 3/2022 | Nagai | G01G 19/393 |
| 11,339,001 B2 | * | 5/2022 | Suemichi | G01G 19/393 |
| 2003/0089529 A1 | * | 5/2003 | Komatsu | G01G 19/393 177/25.18 |

(Continued)

FOREIGN PATENT DOCUMENTS

| CN | 105815803 B | * | 5/2018 |
|---|---|---|---|
| DE | 3 279 620 A1 | | 2/2018 |

(Continued)

*Primary Examiner* — Natalie Huls
(74) *Attorney, Agent, or Firm* — Norris McLaughlin, P.A.

(57) ABSTRACT

A combination weighing device is provided that includes a plurality of article suppliers disposed in juxtaposition with each other and adapted to transport and supply articles to a plurality of weighing units. The combination weighing device further includes an article transporter adapted to drop and supply the transported articles from a direction intersecting with a direction of transport of the articles by the article suppliers, and an article split-and-guide member adapted to split, drop and guide the articles in a direction of juxtaposition of the article suppliers.

6 Claims, 16 Drawing Sheets

Lateral direction

(56) References Cited

U.S. PATENT DOCUMENTS

2009/0178861 A1* 7/2009 Hayakawa ............. G01G 13/18
  177/245
2010/0108405 A1 5/2010 Kieselhorst

FOREIGN PATENT DOCUMENTS

| JP | 60-10125 A | 1/1985 |
| JP | 11-56630 A | 3/1999 |
| JP | 2005-140713 A | 6/2005 |
| JP | 2013-156072 A | 8/2013 |
| JP | 2018-077074 A | 5/2018 |

\* cited by examiner

Front-back direction

Lateral direction

Lateral direction

F I G. 1 2
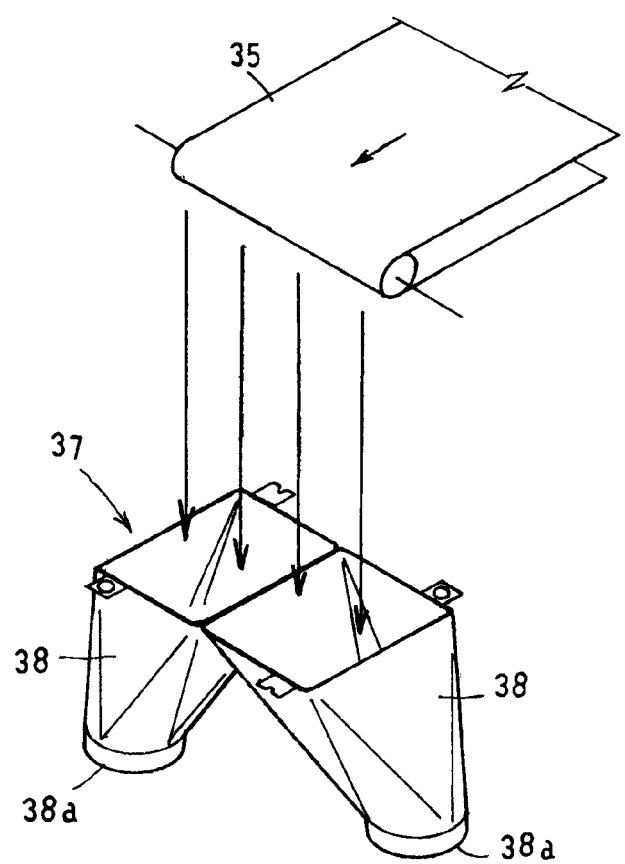

COMBINATION WEIGHING APPARATUS WITH A PLURALITY OF ARTICLE SUPPLIERS

TECHNICAL FIELD

The present invention relates to a combination weighing device for use in mixing and weighing predetermined quantities of different kinds of articles that range in a wide variety, for example, foodstuffs, snacks and sweets.

BACKGROUND ART

Patent document 1 describes an example of combination weighing devices designed to mix and weigh different kinds of articles. The combination weighing device described in this patent document is equipped with a large number of weighing units and linear feeders disposed correspondingly to these weighing units. The weighing units and the linear feeders are respectively disposed in juxtaposition with each other in a lateral direction. In this combination weighing device, articles are once stored in a large number of retaining hoppers and then dropped downward to article-incoming ends of the linear feeders. Then, the articles are vibrationally transported by these linear feeders into supply hoppers of the weighing units disposed correspondingly to the linear feeders.

CITATIONS LIST

Patent Document

Patent Document 1: Japanese Unexamined Patent Publication No. 2018-77074

SUMMARY OF INVENTION

Technical Problems

A combination weighing device may be used to mix and weigh articles that range in a wide variety. In case the articles thus mixed and weighed are, for example, sticky and easily stick together in a lump, it may be difficult to transport such articles using the linear feeders and to stably supply the articles, in a small quantity at a time, to the weighing units. In this instance, the articles may not be transported at all or may be oversupplied to the weighing units. Such sticky articles may be first supplied to the weighing units and then supplied in a small quantity to one of the weighing units In order to supply two or more weighing units with the same type of articles, such articles should be first supplied to the linear feeders from which the articles are transported and supplied to the weighing units.

In this instance, the same type of articles may be transported by one transport device and supplied to the linear feeders.

In the transport device used then, the articles may be transported and discharged from its discharge end extending in a direction orthogonal to a direction of transport of the articles and then thrown into the linear feeders juxtaposed with each other.

This transport device may be so disposed that its direction of transport follows the direction of transport of articles by the linear feeders. In this instance, the discharge end of this transport device is parallel to a direction orthogonal to the direction of transport of articles, i.e., direction in which the linear feeders are arranged next to each other.

The transport device thus configured may allow the articles to be discharged widely from its discharge end extending along the direction of juxtaposition and then supplied into the linear feeders arranged next to each other.

In some of the sites where the combination weighing devices are installed, however, it may be difficult due to certain layout requirements to dispose the transport device in a manner that its direction of transport follows the direction of transport of articles by the linear feeders.

Specifically, the transport device may have to be disposed in a manner that, for example, the direction of transport of this transport device is orthogonal to the direction of transport of the juxtaposed linear feeders as described later.

The discharge end of the transport device extends along a direction orthogonal to the direction of the linear feeders arranged next to each other. The discharge end of the transport device, if increased in width, only becomes longer along the direction of transport of articles by the linear feeders.

The articles, therefore, may fail to be widely discharged in the direction in which the linear feeders arranged next to each other. Some of these linear feeders, for example, the linear feeder at the center in the direction may be abundantly supplied with the articles discharged from the transport device, whereas the other linear feeders, for example, the linear feeders at two ends in the direction may only receive fewer articles.

In case the articles supplied to the linear feeders are thus variable in quantity from one linear feeder to the others, the articles supplied to and received by weighing units from these linear feeders may also be variable in quantity, as result of which the articles supplied to and received by weighing hoppers of the weighing units may likewise be variable in quantity. Then, some of the weighing hoppers may not be supplied with any article at all, while the other weighing hoppers may be oversupplied with the articles. Thus, fewer weighing hoppers than expected may only be available for combinatorial computations, resulting in a poor combinational accuracy. Otherwise, the combinatorial computations per se may become impossible, and weighing cycles may be generated in which no article is dischargeable, inviting a poor production yield.

The present invention was accomplished to address these issues of the known art and is directed to providing solutions that allow target articles to be split and supplied evenly to a plurality of article suppliers from which the articles are transported and supplied to a plurality of weighing units.

Technical Solutions

To this end, the present invention provides the following technical features.

1) A combination weighing device according to the present invention includes a plurality of article suppliers disposed in juxtaposition with each other, the plurality of article suppliers being adapted to transport and supply articles to a plurality of weighing units; an article transporter adapted to transport the articles from a direction intersecting with a direction of transport of the articles by the plurality of article suppliers, the article transporter being further adapted to drop and discharge the articles from above the plurality of article suppliers; and an article split-and-guide member adapted to drop and guide the articles discharged from an article-outgoing end of the article transporter in a manner that the articles split into a plurality of places in a direction of juxtaposition of the plurality of article suppliers.

According to the present invention, the articles are dropped and discharged by the article transporter from a direction intersecting with, for example, orthogonal to the direction of transport of the article suppliers, and the articles discharged from the article transporter are split into a plurality of places in the direction of juxtaposition of the article suppliers and are further guided to flow downward. This may allow the articles to be dispersed well and evenly supplied to the article suppliers arranged next to each other.

2) According to a preferred embodiment of the present invention, the direction intersecting with the direction of transport may be a direction orthogonal to the direction of transport, and the article transporter may drop and discharge the articles from the article-outgoing end having a certain width.

According to this embodiment, the article transporter transports the articles from a direction orthogonal to the direction of transport of articles by the article suppliers and then drops and discharges the articles downward from the article-outgoing end having a certain width. Then, the article split-and-guide member splits the discharged articles, guiding them to flow downward into a plurality of places in the direction of juxtaposition of the article suppliers. In this manner, the articles may be dispersed well and relatively evenly supplied to the article suppliers arranged next to each other.

3) According to another embodiment of the present invention, the article split-and-guide member may include a plurality of split funnels arranged in adjacency to each other, and discharge positions of the plurality of split funnels at lower ends thereof may be displaced from each other in the direction of juxtaposition.

According to this embodiment, the articles discharged from the article transporter may be guided to flow downward by the split funnels disposed in adjacency to each other and may thereby be precisely dispersed into a plurality of desired places.

According to yet another embodiment of the present invention, the article transporter may include an upper tank having a cylindrical shape, and a belt conveyer disposed below the upper tank to transport and drop the articles downward to be discharged.

According to this embodiment, the articles retained in the upper tank may be transported out of the bottom part of the upper tank by the belt conveyer and then dropped downward and discharged.

5) According to yet another embodiment of the present invention, the plurality of article suppliers may be linear feeders.

According to this embodiment, the articles may be vibrationally transported by the linear feeders into the weighing units.

6) According to yet another embodiment of the present invention, the combination weighing device may further include a retaining hopper at a position below the article split-and-drop member, the retaining hopper being adapted to introduce the articles guided to flow downward by the article split-and-guide member into the plurality of article suppliers.

According to this embodiment, the articles split and dispersed by the article split-and-guide member are once retained in the retaining hopper and then guided to the article-incoming ends of the article suppliers. By thus controlling the quantity of articles to be retained in the retaining hopper to a relatively small quantity or less, the articles may be suppliable to the article suppliers without being jammed or stuck in the retaining hopper which may happen if the articles piled up there are too heavy.

According to other embodiments of the present invention, the article split-and-guide member may be housed in a housing tank having a cylindrical shape.

According to the embodiments, certain types of articles may be suppliable, with the article split-and-guide member having been removed from the housing tank.

8) According to yet another embodiment of the present invention, the plurality of weighing units may each include a supply hopper and a weighing hopper that are vertically disposed, the supply hoppers being suppliable with the articles from the plurality of article suppliers, the weighing hoppers being adapted to retain and weigh the articles discharged from the supply hoppers, and the plurality of weighing units may be disposed in juxtaposition with each other correspondingly to the plurality of article suppliers.

According to this embodiment, the article suppliers are disposed in juxtaposition with each other, and the weighing units, which each include the supply hopper and the weighing hopper that are vertically disposed, are disposed in juxtaposition likewise correspondingly to the article suppliers. When an operator wants to use a greater number of weighing units to supply these supply hoppers with a broader range of articles, for example, the linear feeders and the weighing units respectively disposed in juxtaposition may be simply increased in the directions of their juxtaposition. Thus, the combination weighing device thus structured may be allowed to have a relatively flat and compact structure.

Effects of the Invention

According to the present invention, the article transporter transports the articles from a direction intersecting with the direction of transport of articles by the article suppliers and then drops the articles downward to be discharged, and the articles thus dropped and discharged are split by the split-and-guide member into a plurality of places in the direction of juxtaposition of the article suppliers and then guided to flow downward. In this manner, the articles may be dispersed well and supplied evenly to the article suppliers juxtaposed with each other.

BRIEF DESCRIPTION OF THE DRAWINGS

FIG. 12 is a schematic perspective view of a belt conveyer and an article split-and-guide member.

DESCRIPTION OF EMBODIMENTS

Embodiments of the present invention are hereinafter described in detail with reference to the accompanying drawings.

Figure 1:
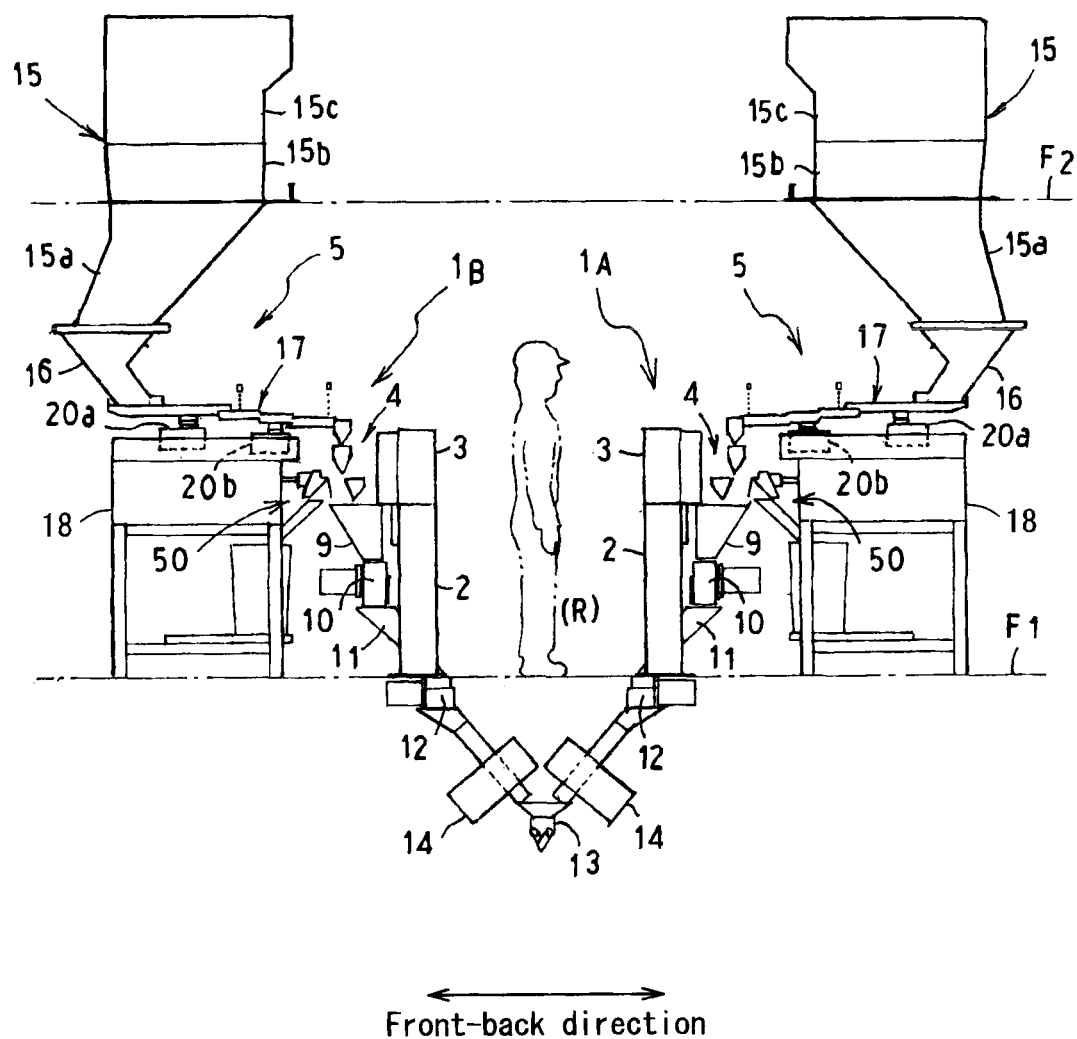
FIG. 1 is a schematic side view of a combinatorial weighing device according to an embodiment of the present invention.
Figure 2:
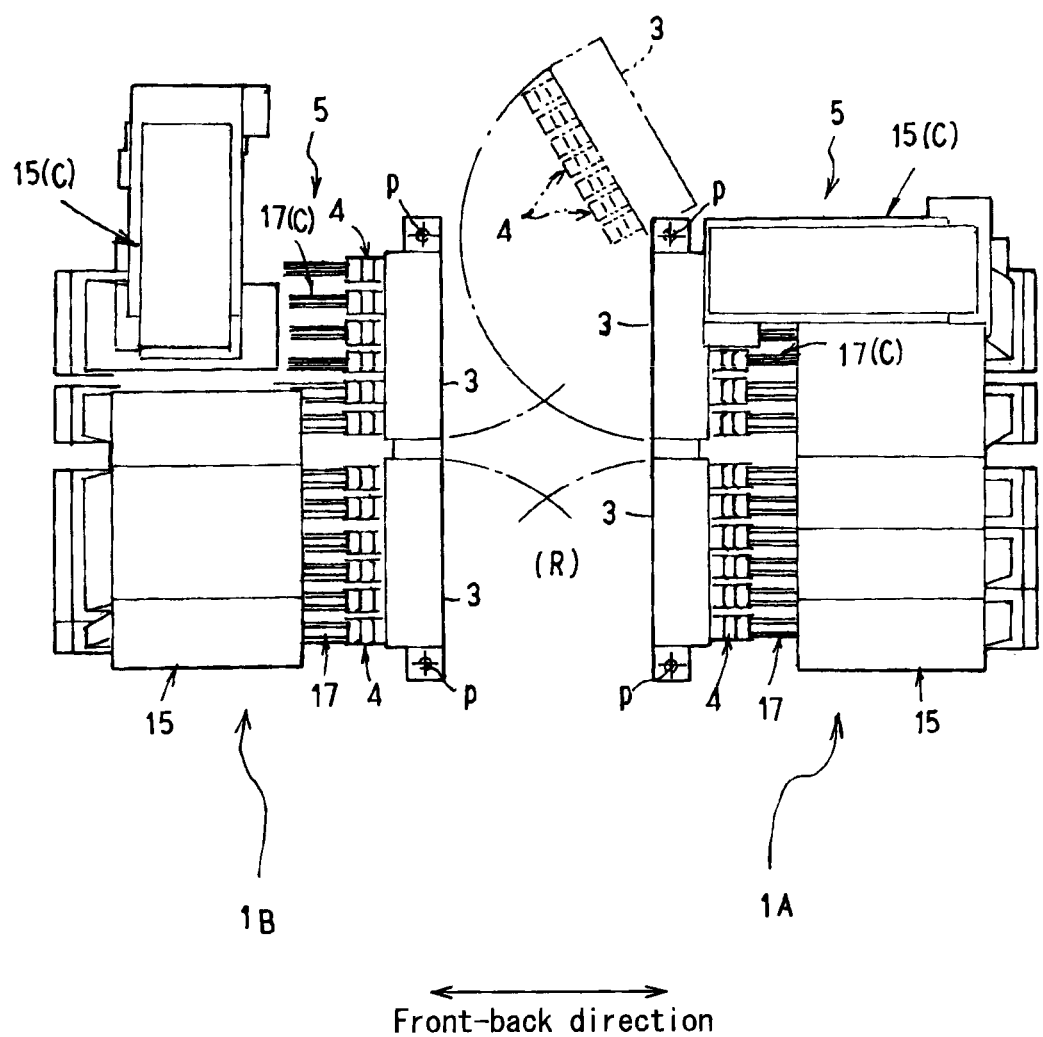
FIG. 2 is a schematic plan view of the combinatorial weighing device illustrated in FIG. 1.
Figure 3:
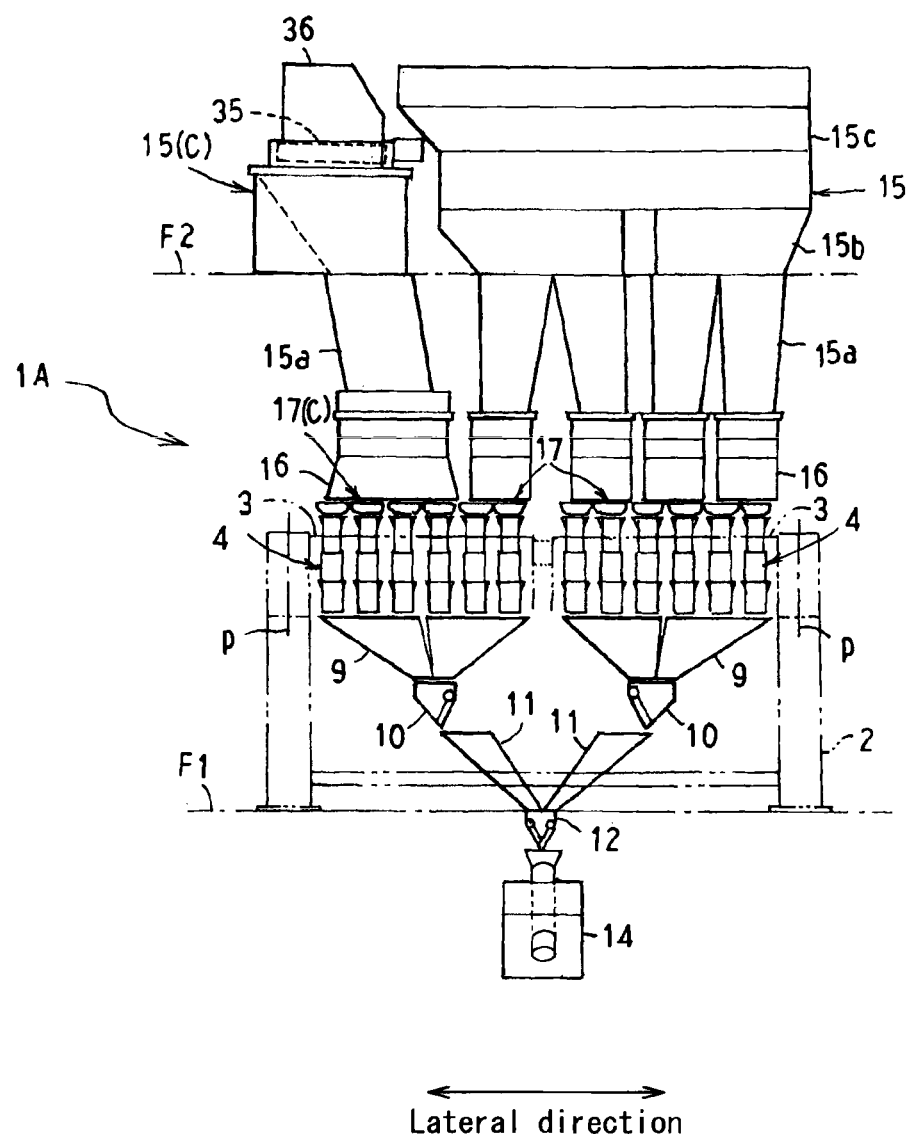
FIG. 3 is a schematic front view of one of weighing devices illustrated in FIG. 1.
Figure 4:
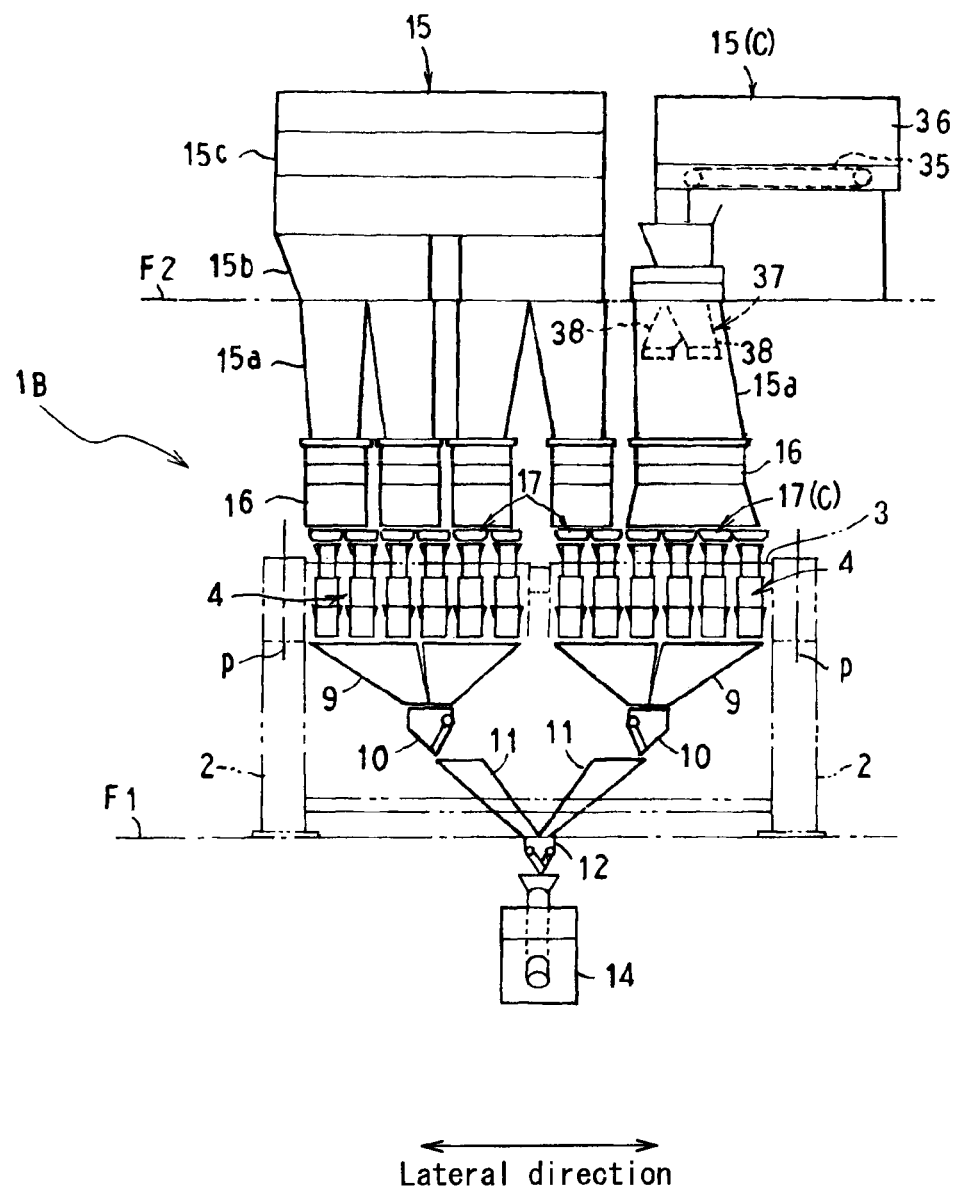
FIG. 4 is a schematic front view of the other weighing device illustrated in FIG. 1.

FIG. 1 is a schematic side view of a combinatorial weighing device according to an embodiment of the present invention. FIG. 2 is a schematic plan view of the combinatorial weighing device. FIGS. 3 and 4 are schematic front views of weighing devices.

The combination weighing device according to this embodiment is for use in mixing and weighing predetermined quantities of articles that range in a wide variety (for example, eight kinds of articles) such as foodstuffs including snacks and sweets. More specifically, this combination weighing device may be suitably used to mix and weigh, for example, snacks to go with alcohol drinks in which nuts, bean snacks and/or cubic rice crackers are mixed into pouches with one or two small fishes cooked in mirin.

This combination weighing device is installed on a first floor surface F1 for use in a packaging line, in which weighed articles are thrown in and packed into bags in a packaging apparatus, not illustrated in the drawing, located on a lower level than the floor surface.

For readability of this specification to better understand the structural features of this combination weighing device, a front-back direction is hereinafter used to refer to the transverse direction on the drawings of FIGS. 1 and 2, and the direction from the near to far side on the drawings of FIGS. 3 and 4. Further, a lateral direction is hereinafter used to refer to the direction from the near to far side on the drawing of FIG. 1, and the transverse direction on the drawings of FIGS. 3 and 4.

As illustrated in FIG. 1, the combination weighing device includes a pair of weighing devices 1A and 1B. These weighing devices 1A and 1B are disposed on the front and back sides in a manner that they face each other, with a central passage R being interposed therebetween. An operator of these weighing devices is allowed to move laterally, from right to left and vice versa, through this central passage R. The weighing devices 1A and 1B are essentially configured likewise, structural features of which are hereinafter described.

On the inner sides of the weighing devices 1A and 1B (on the sides of the central passage R), two bases 3 are each disposed on a support frame 2 vertically disposed on the first floor surface F1 and thereby stands to a predetermined height. The bases 3 are disposed so as to extend in the lateral direction. On the outer sides of the bases 3 (on the sides opposite to the central passage R), multiple weighing units 4 are disposed in a row in the lateral direction. In the illustrated example, the weighing devices 1A and 1B are each equipped with 12 weighing units 4 that are lined up in a row. A wide variety of articles may be successfully mixed and weighed with these 24 weighing units 4, in total, of the weighing devices 1A and 1B.

An article supplier 5 is disposed on the outer side of the weighing units 4. The article supplier 5 supplies various kinds of articles to be weighed to positions above the weighing units 4.

Figure 5:
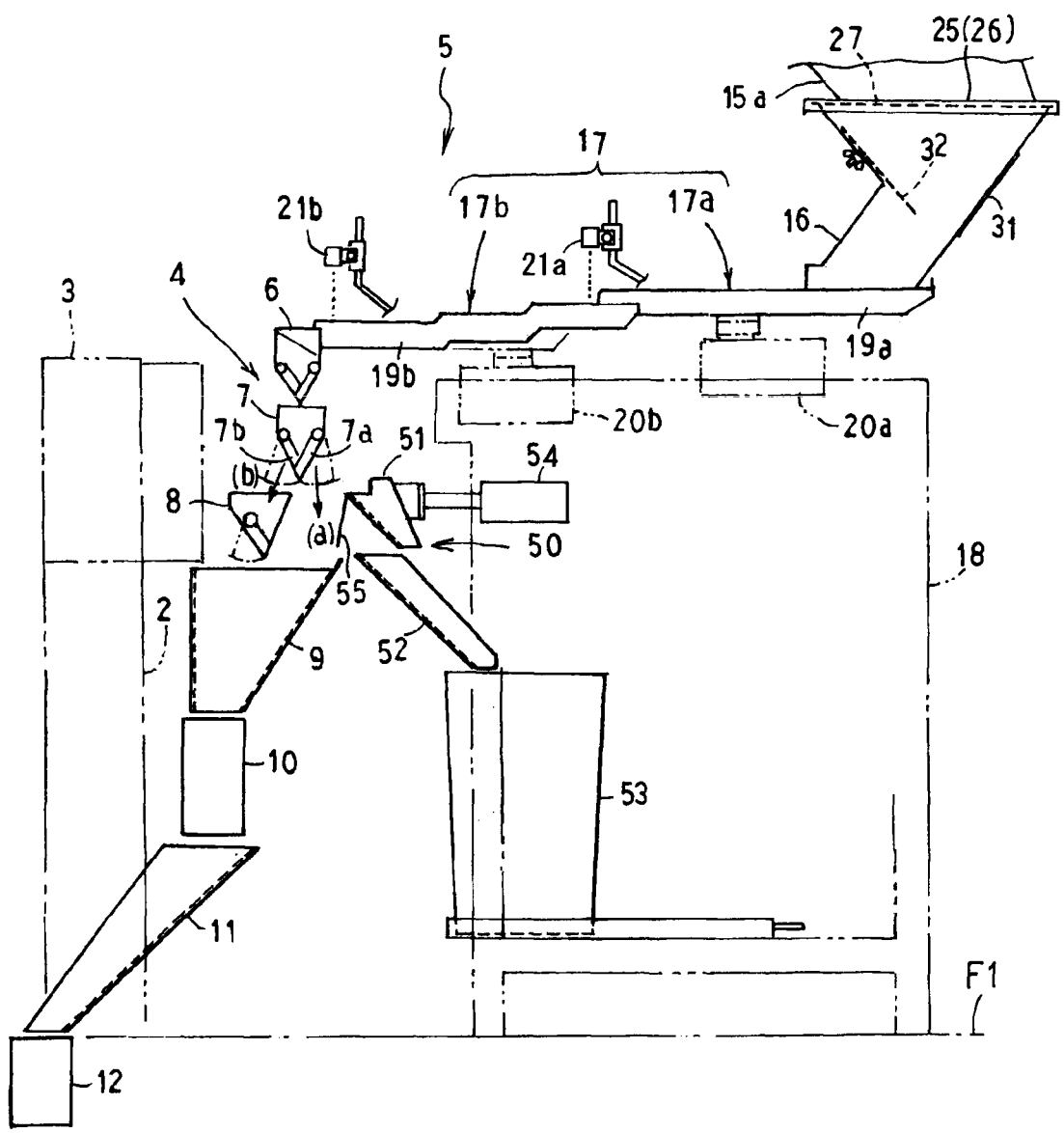
FIG. 5 is a side view of principal components of the weighing device.
Figure 6:
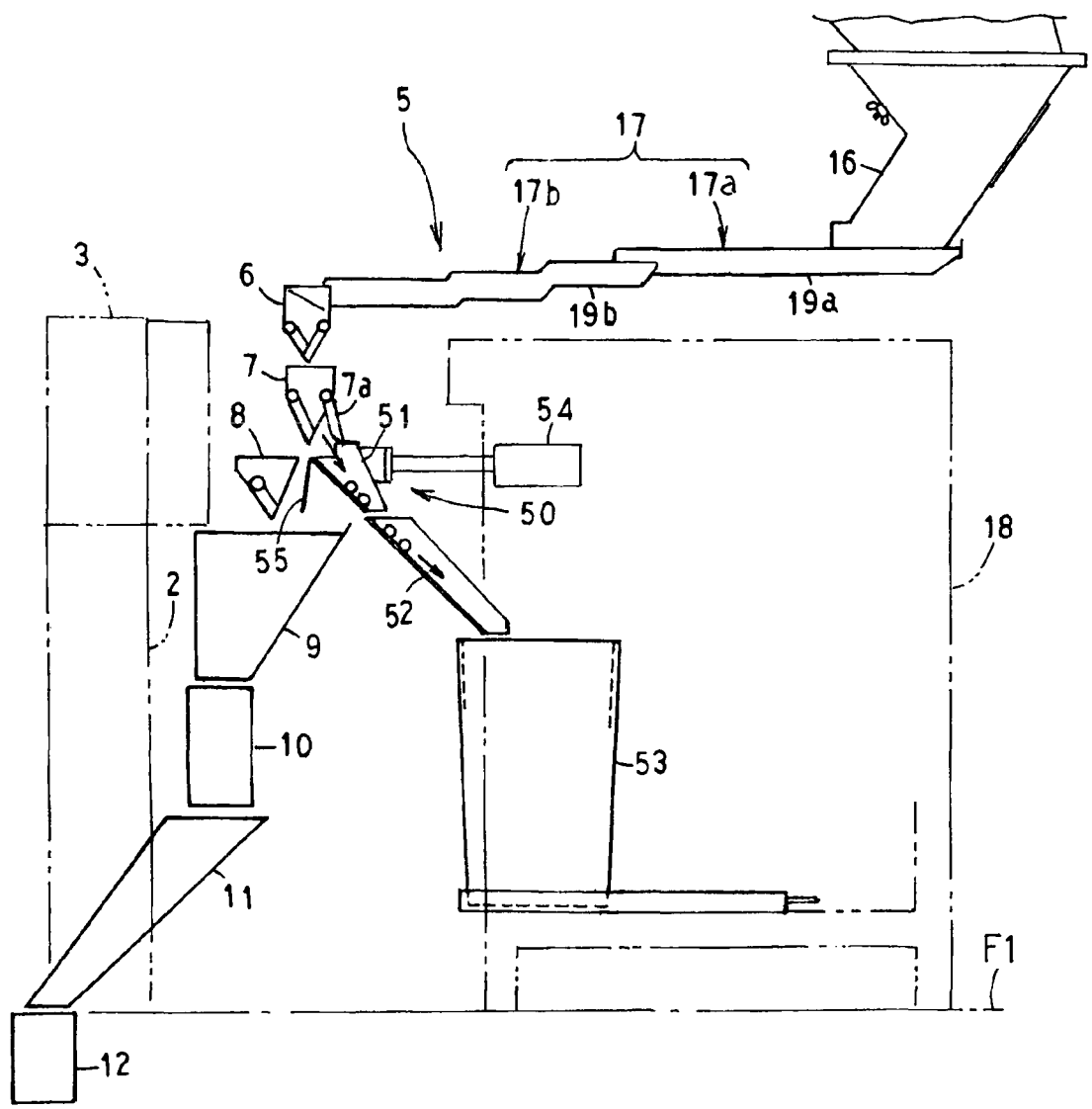
FIG. 6 is a side view of principal components of the weighing device during a REJECT status.

As illustrated in FIG. 5, the weighing units 4 are essentially configured as in the known art. The weighing units 4 each include a supply hopper 6, a weighing hopper 7, and a memory hopper 8. These hoppers 6, 7 and 8 are vertically disposed in a row and respectively have gates adapted to open and close. The supply hopper 6 receives articles transported from the article supplier 5 and then temporarily retains and discharges the received articles. The weighing hopper 7 retains the articles discharged from the supply hopper 6 and then weighs and discharges the retained articles. The memory hopper 8 receives the articles weighed by and discharged from the weighing hopper 7 and then temporarily retains and discharges the received articles.

The supply hopper 6, weighing hopper 7, and memory hopper 8 are detachably fitted to the base 3. In the base 3 are housed such devices as a mechanism to open and close the gates of these hoppers and a weight sensor used to measure the weights of the weighing hoppers 6.

As illustrated with a virtual line in FIG. 2, the bases 3 are supported in upper parts of the support frame 2 in a manner that these bases are pivotable around fulcrums p vertically extending at lateral ends. When the base 3 is pivoted toward the central passage R around the fulcrum vertically extending at the lateral end to have the weighing units 4 exposed to a large extent, the hoppers and other components may be easily attached and detached to and from the base 3 for maintenance and other purposes.

As illustrated in FIG. 5, the weighing hopper 7 has, at its lower end, an outer gate 7a and an inner gate 7b that are adapted to independently open and close. When the outer gate 7a alone is oscillated to open, the weighed articles are discharged directly into a first collection chute 9 disposed below through a first outgoing path (a). When the inner gate 7b alone is oscillated to open, the weighed articles are discharged into the memory hopper 8 through a second outgoing path (b) and temporarily retained in the memory hopper 8.

The weighing units 4 are each equipped with a memory hopper 8. These memory hoppers 8, as well as the weighing hoppers 7, may be allowed to participate in combinatorial computations. Thus, more hoppers may be available for combinatorial computations (available hoppers).

At positions below the weighing hoppers 7 and the memory hoppers 8, four first collection chutes 9 are disposed in a row in the lateral direction. These first collection chutes 9 collect the articles dropping downward from the weighing hoppers 7 or the memory hoppers 8 determined and selected as having a predetermined combined weight by the combinatorial computations. Two first collection hoppers 10 are each disposed at a position below two adjacent ones of the first collection chutes 9. These first collection hoppers 10 temporarily receive and retain the articles collected by the first collection chutes 9. Two second collection chutes 11 are disposed at positions below the first collection gates 10. These second collection chutes 11 guide and collect the articles dropping downward from the first collection gates 10. In a respective one of the weighing devices 1A and 1B, a second collection hopper 12 is disposed at a position below the second collection chutes 11. In the second collection hopper 12 are gathered together and temporarily retained the articles weighed and collected by the 12 weighing units 4.

As illustrated in FIG. 1, a final collection hopper 13 is disposed at a position down below the central passage R. In the final collection hopper 13 are gathered together the articles discharged from the second collection hoppers 12 of both of the weighing devices 1A and 1B. This final collection hopper 13 is opened and closed in response to a supply request instruction outputted from the packaging apparatus. A metal detector 14 is disposed in a guiding path through which the articles are dropping downward from the second collection hopper 12 into the final collection hopper 13. The metal detector 14 monitors whether the articles are contaminated with any metallic foreign matter.

The article supplier 5 has retaining tanks 15 in which the articles are retainable, and retaining hoppers 16 continuous to lower ends of the retaining tanks 15. The article supplier 5 further has 12 linear feeders 17; an example of the article suppliers described herein. The linear feeders 17 are disposed next to each other in the lateral direction at positions above a support table 18. The linear feeders 17 vibrationally transport the articles dropping downward from lower ends of the retaining hoppers 16 into the 12 weighing units 4.

The retaining tanks 15 include a lower-stage tank 15a, a mid-stage tank 15b, and an upper-stage tank 15c. The lower-stage tank 15a is fitted into and supported by the opening of a second floor surface F2 located at a position way above the first floor surface F1. The mid-stage tank 15b is detachably and supportably fitted to an upper part of the lower tank 15a, and the upper-stage tank 15c is attached likewise to an upper part of the mid-stage tank 15b. The retaining hopper 16 is detachably and supportably coupled to a lower end of the lower-stage tank 15a as described later.

As illustrated in FIG. 5, the linear feeder 17 includes two linear feeders; an upstream linear feeder 17a, and a downstream linear feeder 17, which are respectively disposed on upstream and downstream sides in the direction of transport of articles. The upstream linear feeder 17a and the downstream linear feeder 17b are disposed in tandem, with the upstream linear feeder being located at an upper position than the downstream one, like a stepwise slope directed downward. These linear feeders 17a and 17b respectively have troughs 19a and 19b and vibration generating mechanisms 20a and 20b. The troughs 19a and 19b are shaped in the form of a groove in cross section. The vibration generating mechanisms 20a and 20b are disposed at upper positions of the support table 18. The troughs 19a and 19b are detachably coupled to vibration heads of the vibrating mechanisms 20a and 20b.

The articles thrown out of the retaining hopper 16 into the upstream linear feeder 17a are vibrationally transported into the downstream linear feeder 17b. Then, the articles are thrown, in a small quantity at a time, out of the article-outgoing end of the downstream linear feeder 17b into the supply hopper 6 of the weighing unit 4.

Article sensors 21a and 21b are disposed at positions above the linear feeder 17. These article sensors 21a and 21b may detect, using, for example, laser, heights of the articles piled up at the article-incoming end and the article-outgoing end of the downstream linear feeder 17b. The vibrating mechanisms 20a and 20b are driven to generate vibration based on information of article detection outputted from the article sensors 21a and 21b, so that the linear feeders 17 are each allowed to uniformly transport the articles.

Figure 10:
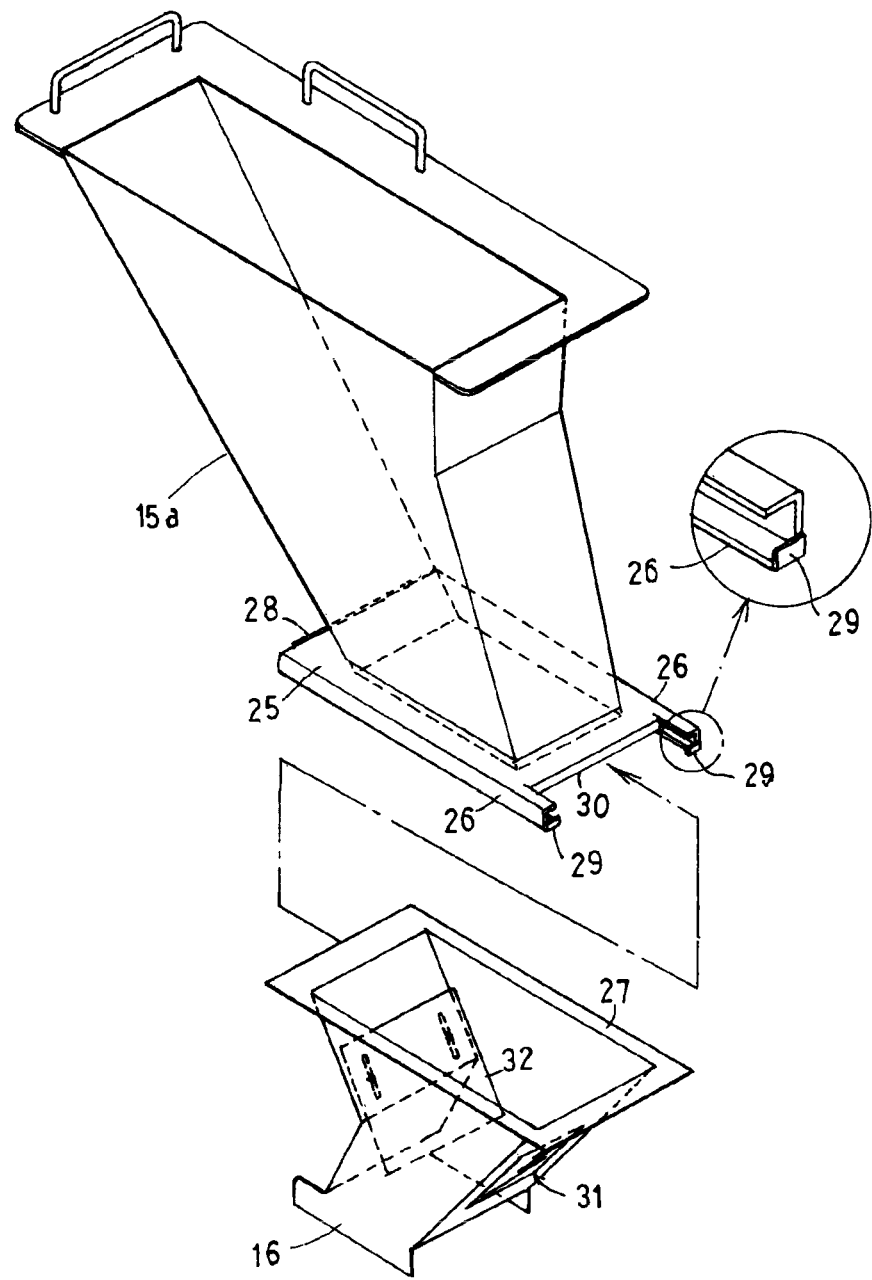
FIG. 10 is an exploded perspective view of a tank structure.

Next are described structural features that allow the retaining hopper 16 to be detachably and supportably coupled to a lower end of the lower-stage tank 15a among the retaining tanks 15. As illustrated in FIG. 10, the lower-stage tank 15a has, at its lower end, a hopper supporter 25 having a size slightly larger than an opening at the lower end of this tank. The hopper supporter 25 has a pair of support rails 26 on right and left sides. The support rails 26, bending inward so as to face each other, are formed with a predetermined interval therebetween.

A flange 27 is formed so as to extend from a rectangular throw-in port formed at an upper end of the retaining hopper 16. This flange can be pushed and pulled, from the rear side (from the side opposite to the central passage R), in and out of the support rails 26 of the hopper supporter 25. A first stopper 28, horizontally long and bending upright, is formed at a position on the inner end side (on the side of the central passage R) of the hopper supporter 25 to receive the front end side of the inserted flange 27. Second stoppers 29, vertically small and bending upright, are formed at positions on the outer end side (from the side opposite to the central passage R) to receive the lateral rear ends of the inserted flange 27.

A hopper restrictor 30, bending downward, is formed on the outer side of the hopper supporter 25 to prevent the supported retaining hopper 16 from rising upward. An interval between a lower end of the hopper restrictor 30 and an upper end of the second stopper 29 has a dimension large enough to allow the flange 27 to pass through.

Figure 11A:
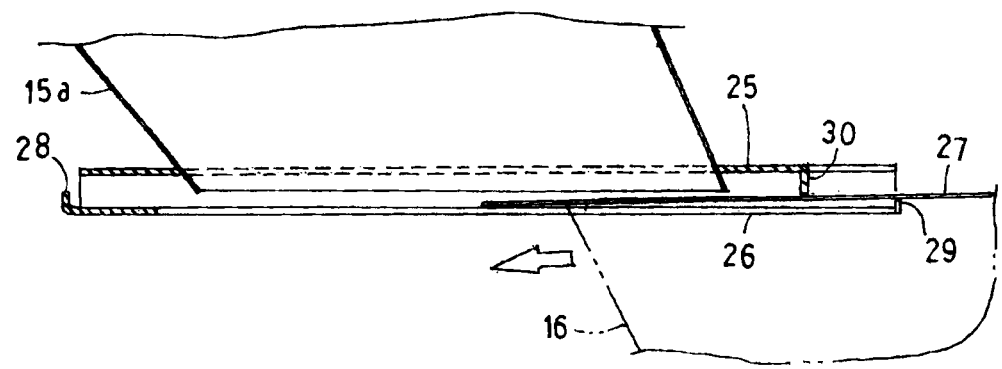
FIG. 11A is a side view illustrating steps of tank structure mounting steps.
Figure 11B:
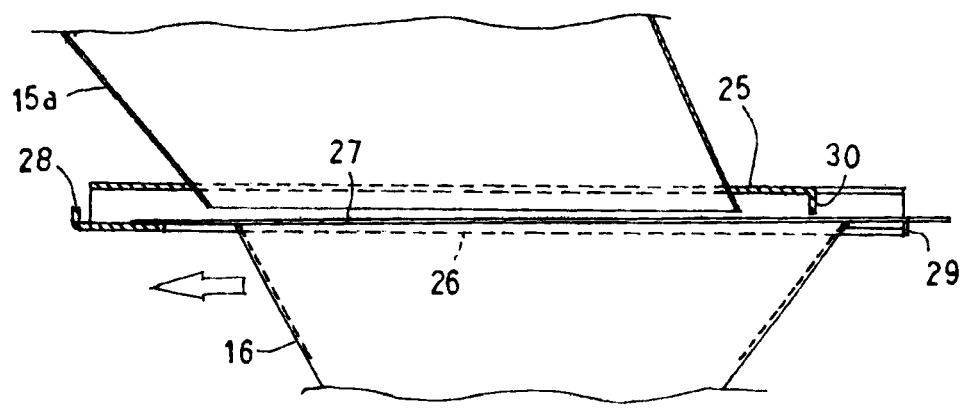
FIG. 11B is a side view illustrating tank structure mounting steps.
Figure 11C:
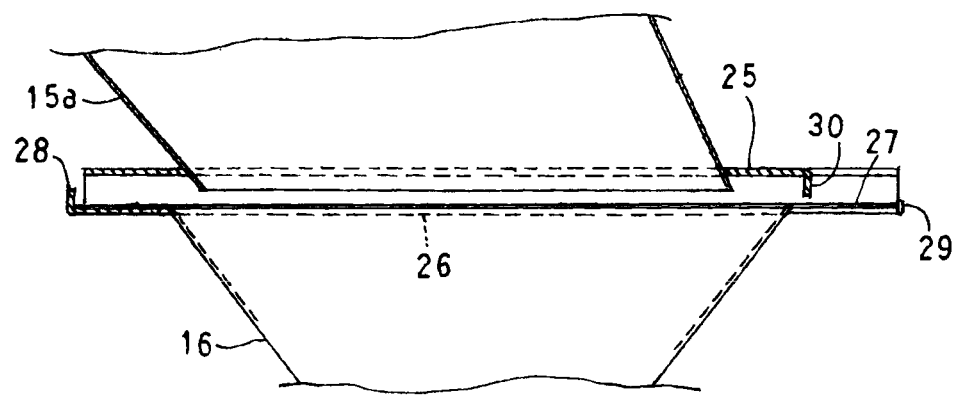
FIG. 11C is a side view illustrating tank structure mounting steps.

In order to couple the retaining hopper 16 to the lower-stage tank 15a, as illustrated in FIGS. 11A to 11C, the retaining hopper 16 is inclined with the front side of its flange 27 being slightly directed downward, and the retaining hooper 16 thus inclined is located in proximity to the hopper supporter 25 and then inserted into the support rails 26 through the interval between the lower end of the hopper restrictor 30 and the upper end of the second stopper 29.

When the front end side of the flange 27 is butted against the first stopper 28, the retaining hopper 16 is prevented from advancing any further into the rails. At the time, the rear end side of the flange 27 has been moved forward to a position past the second stopper 29. The retaining hopper 16 is then put back to its horizontal position again, and right and left end sides of the flange 27 are pushed into the support rails 26. Thus, front and rear end sides of the flange 27 are set in position by the first stopper 28 and the second stopper 29 and are thereby immovable forward and backward. As a result, the retaining hopper 16 is located and supportably suspended in a manner that for-, back-, right-, and leftward movements are not allowed relative to the lower-stage tank 15a.

In order to remove the retaining hopper 16 supported by the support rails 26, a rear part of the retaining hopper 16 is slightly lifted upward, and the rear end side of the flange 27 is moved to an upper position than the second stopper 29. When the retaining hopper 16 is then pulled outward, the retaining hopper 16 is removable from the lower-stage tank 16a.

Thus, the retaining hopper 16 may be readily attachable and removable to and from the support rails 26 without using any tool. Further advantageously, the retaining hoper 16 simply structured with the flange 27 alone may be easily handleable during, for example, cleaning.

The retaining hopper 16 is supportably suspended from the lower-stage tank 15a, which makes it unnecessary to additionally provide a support member, like a frame, to support the retaining hopper 16. This may avoid the risk of interference of such a frame with the retaining hopper 16 when attached and detached to and from the tank.

As described earlier, the lower-stage tank 15a is fitted in and supported by the opening on the second floor surface F2. The mid-stage tank 15b is positioned to and supported by the lower-stage tank 15a, and the upper-stage tank 15c is positioned to and supported by the mid-stage tank 15b by having their convex and concave shapes fitted into each other. These tanks 15a to 15c may be readily attachable and removable without using any tool and thus easily handleable during, for example, cleaning.

As illustrated in FIGS. 5 and 10, the retaining hopper 16 has a monitoring window 31 on a side surface of a vertically intermediate part thereof. An operator is allowed to watch, through this monitoring window 31, whether the articles are being retained and how many articles are currently retained in the retaining hopper 16. The retaining hopper further has a sliding shutter 32 at a vertically intermediate part thereof. An opening area at the lower end of the retaining hopper 16 may be adjustable by controlling the sliding shutter 32. The articles may be guided to flow downward at an opening degree of the sliding shutter 32 suitably set for the type of articles being transported. The retaining hopper 16, when its lower end is completely closed, is removable with the articles still remaining therein.

The tanks and feeders described thus far may be standard-spec components used to supply articles that hardly stick together like nuts, bean snacks, and cubic rice crackers. Some linear feeders used to transport, in a small quantity at a time, sticky articles like small rice crackers or small fishes cooked in mirin, and retaining tanks 15 used with such linear feeders are configured differently to the standard-spec ones. In the example described below, of the 12 linear feeders 17 arranged next to one another in the lateral direction, four linear feeders 17(C) on one end side in the lateral direction and a retaining tank 15(C) disposed correspondingly to these feeders are configured according to a specification that differs from the standard specification, as illustrated in FIGS. 2 to 4. This structural feature is hereinafter described.

The different-spec retaining tank 15(C) is provided with a belt conveyor 35 having a large width. This belt conveyor is used to transport articles, smooth downward flow of which may be difficult under their own weights. The belt conveyor 35 is so disposed that is horizontally pivotable along a lower part of an upper tank 36 having a rectangular cylindrical shape, as illustrated in FIGS. 3 and 4, By driving the belt conveyor 35 to rotate, the articles retained at the bottom of the upper tank 36 may be forced out of the tank and allowed to widely flow downward into the retaining hopper 16 through the lower-stage tank 15a.

In the illustrated example, the retaining tank 15(C) of the weighing device 1A and the retaining tank 15(C) of the weighing device 1B are differently situated and installed due to, for example, certain layout requirements in a site where the combination weighing device is installed. As for the retaining tank 15(C) of the weighing device 1A, the belt conveyor 35 is rotated in the front-back direction parallel to the direction of transport of articles by the linear feeders 17. In other words, the wide belt conveyor 35 serving as the article transporter is so disposed that the direction of transport of articles by this belt conveyor follows the direction of transport of articles by the four linear feeders 17(C) disposed in juxtaposition. The discharge end (article-outgoing end) of the belt conveyor 35 thus disposed extends along a direction orthogonal to the direction of transport of articles, i.e., the direction of juxtaposition of the four linear feeders 17(C) (lateral direction).

As for the retaining tanks 15(C) of the weighing device 1B, on the other hand, the belt conveyor 35 is rotated in the lateral direction orthogonal to the direction of transport of articles by the linear feeders 17. In other words, the wide belt conveyor 35 is so disposed that the direction of transport of articles by this belt conveyor is orthogonal to the direction of transport of articles by the four linear feeders 17(C) disposed in juxtaposition. The discharge end (article-outgoing end) of the belt conveyor 35 thus disposed is orthogonal to the direction of juxtaposition of the four linear feeders 17(C) (lateral direction).

The articles dropped and discharged from the article-outgoing end of the belt conveyor 35 are guided into the retaining hopper 16 through the lower-stage tank 15a. As for the retaining tank 15(C) of the weighing device 1B, the articles widely flowing out of the article-outgoing end of the belt conveyor 35 are transported into the lower-stage tank 15a. While the four linear feeders 17(C) are disposed in juxtaposition with one another in the lateral direction, the articles are transported out of the belt conveyor 35 widely in the front-back direction extending along the direction of width of the belt conveyor 35.

Supposing that the articles transported from the belt conveyor 35 for the retaining tank 15(C) of the weighing device 1B are dropped immediately downward, two near-center ones of the four linear feeders 17(C) laterally arranged in juxtaposition may be abundantly supplied with the articles, whereas the linear feeders 17(C) on the right and left end sides may only receive fewer articles. The linear feeders 17(C) are supposed to supply a respective one of the supply hoppers 6 with the articles in a small quantity at a time. Yet, if the articles supplied from the belt conveyor 35 to the article-incoming ends of the linear feeders 17(C) are thus variable in quantity, the supply hoppers 6 may possibly be oversupplied with the articles or may fail to receive any article.

Thus, the articles transported by the belt conveyor 35 may possibly be supplied to an off-center position(s) in the lower-stage tank 15a. To prevent that, the weighing device 1B has, in the lower-stage tank 15a serving as the housing tank, an article split-and-guide member 37 with a pair of split funnels 38. As illustrated in FIG. 4, the article split-and-guide member 37, using the paired split funnels 38, guide the articles discharged from the belt conveyor 35 to flow downward and disperse in the lateral direction in which the four linear feeders 17(C) are arranged.

Figure 13:
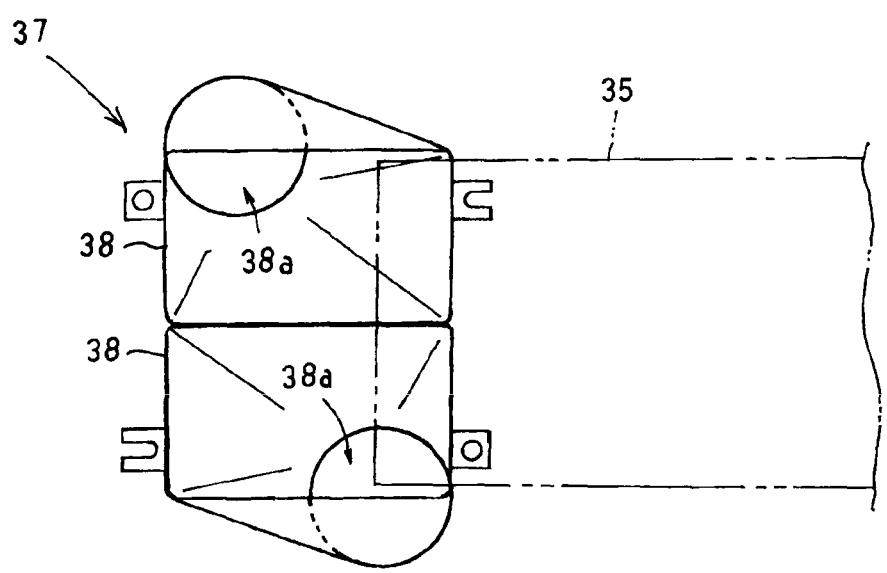
FIG. 13 is a schematic plan view of FIG. 12.

FIG. 12 is a schematic perspective view illustrating the belt conveyor 35 and the article split-and-guide member 37 of the weighing device 1B. FIG. 13 is a schematic plan view of FIG. 12.

The two split funnels 38 are disposed in adjacency to each other along the direction of width of the belt conveyor 35 (front-back direction). The split funnels 38 are so disposed that a border between rectangular inlets at upper ends of these funnels 38 falls on the center of the belt conveyor 35 in the direction of its width.

The split funnels 38 respectively have circular outlets 38a at lower ends. The lower-end outlets 38a of the split funnels 38 are displaced relative to rectangular upper-end inlets of these funnels. The lower-end outlets 38a of the two split funnels 38 disposed in adjacency are distanced from each other in the lateral direction in which the four linear feeders 17(C) are arranged, i.e., in the direction of transport of the belt conveyor 35.

The articles, after being discharged from the article-outgoing end of the belt conveyor 35 and widely dropped to an upper part of the lower-stage tank 15a in the direction of belt width (front-back direction), are guided by the two split funnels 38 to flow downward and disperse in the lateral direction in which the linear feeders 17(C) are arranged. Thus, the articles may be allowed to disperse evenly or relatively evenly and thrown into the article-incoming ends of the four linear feeders 17(C).

According to this embodiment, the belt conveyer 35 transports the articles from a direction orthogonal to the direction of transport of articles by the linear feeders 17(C), the articles are dropped and discharged from the belt conveyer 35 and are split by the article split-and-guide member 237 into two places in the lateral direction in which the four linear feeders 17(C) are arranged. In this manner, the articles may be dispersed and supplied evenly to the four linear feeders 17(C) disposed in juxtaposition with each other.

Further, the articles retained in the upper tank 36 are transported out of the bottom part of the upper tank 36 by the belt conveyer 35. Thus, any articles that easily stick together may be forcibly split apart and then transported.

The articles split and dispersed by the article split-and-guide member 37 are temporarily retained in the retaining hopper 16 and then guided to the article-incoming ends of the linear feeders 17. By controlling the quantity of articles to be retained in the retaining hopper 16 to a relatively small quantity or less, the articles may avoid the risk of being jammed or stuck in the retaining hopper 16 which may happen if the articles piled up there are too heavy.

Figure 7A:
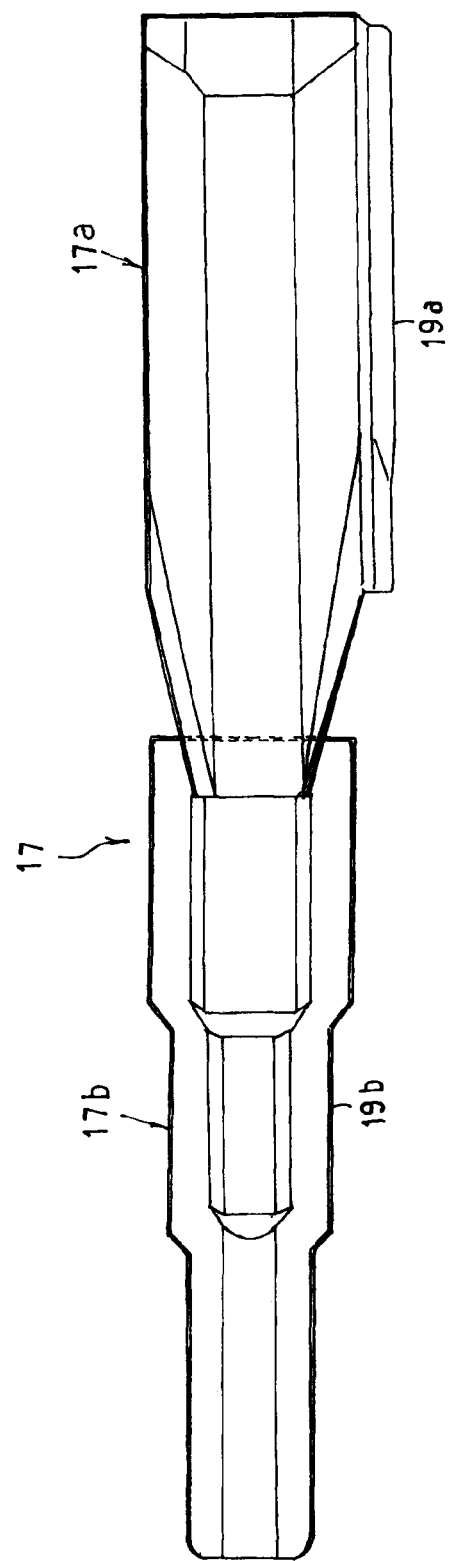
FIG. 7A is a plan view of a linear feeder produced according to a standard specification.
Figure 7B:
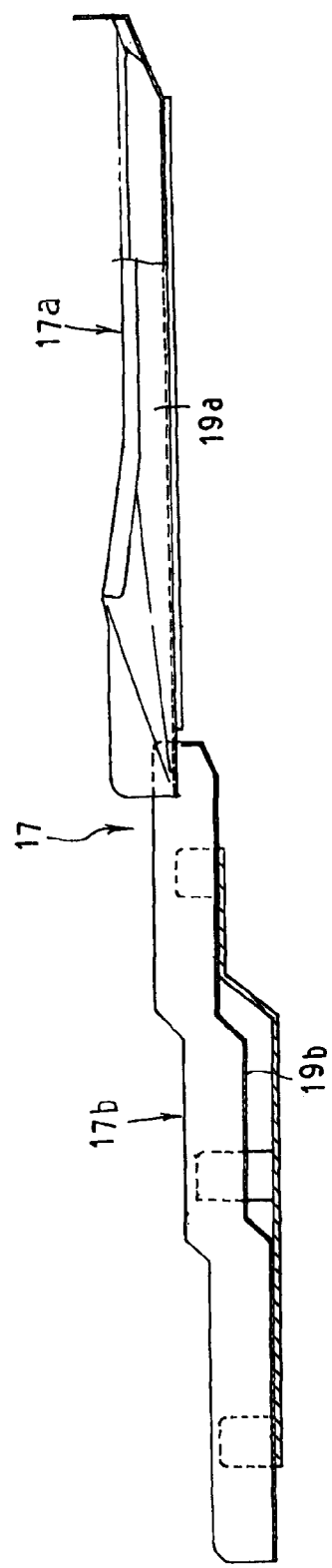
FIG. 7B is a longitudinal side view in part of the standard-spec linear feeder.
Figure 8A:
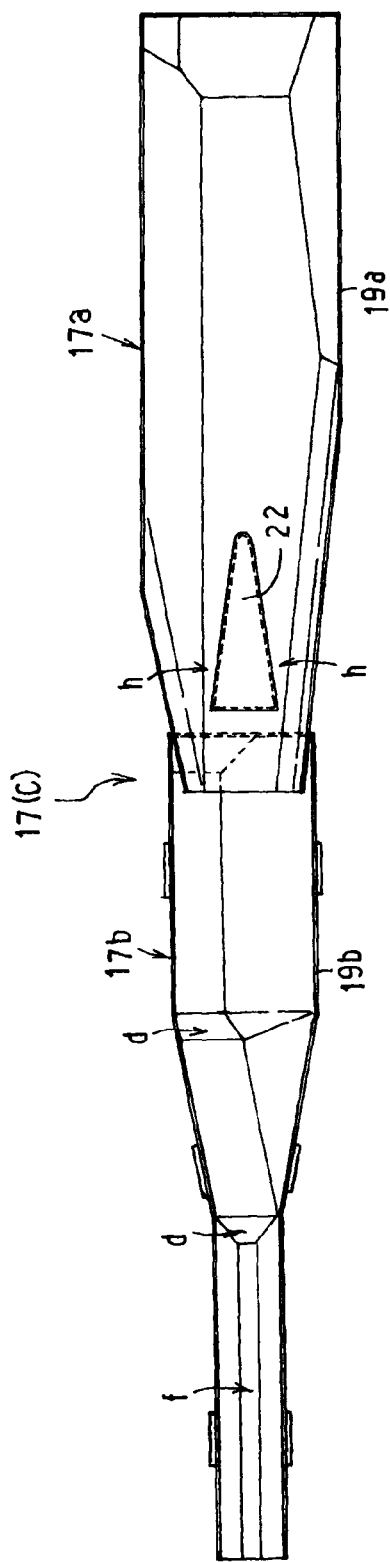
FIG. 8A is a plan view of a linear feeder produced according to a different specification.
Figure 8B:
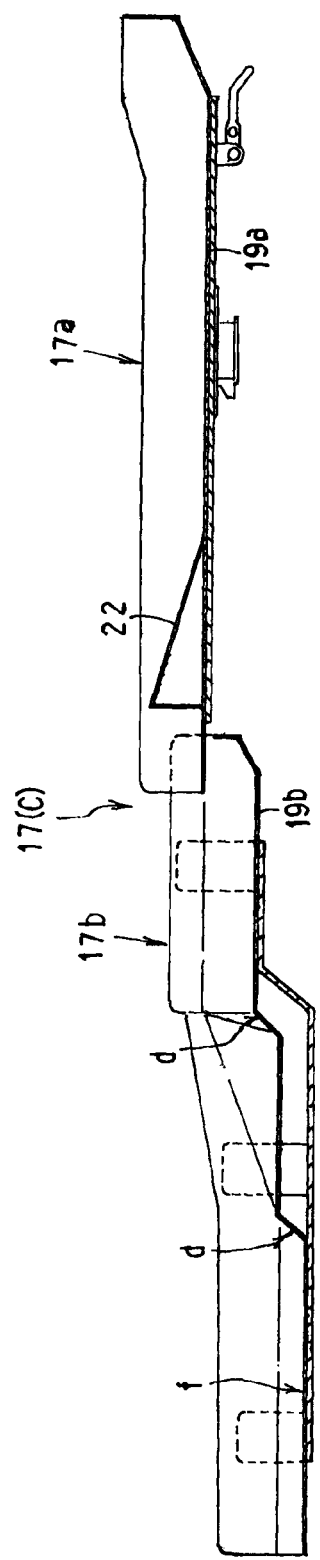
FIG. 8B is a longitudinal side view of the different-spec linear feeder.
Figure 9:
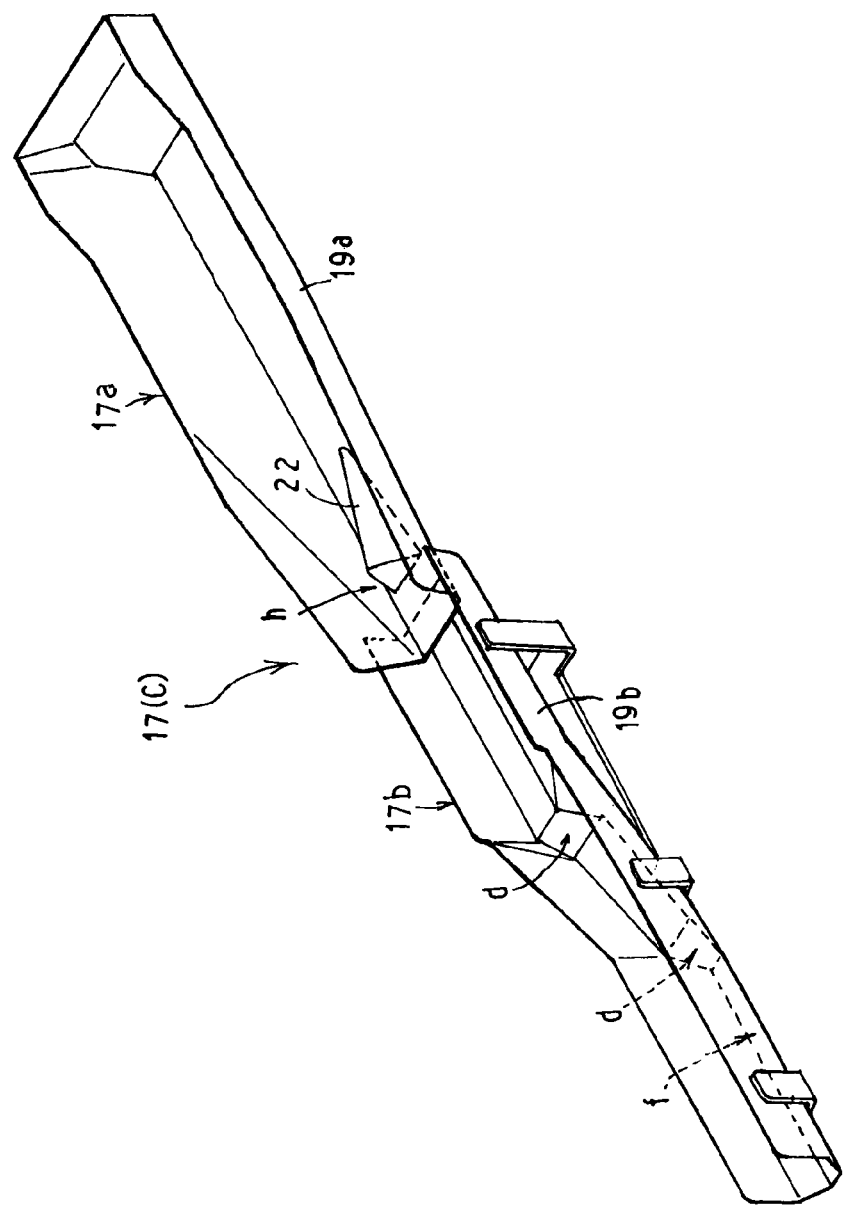
FIG. 9 is a perspective view of the different-spec linear feeder.

FIGS. 7(A) and 7(B) illustrate the standard-spec linear feeder 17, while FIGS. 8(A), 8(B) and 9 illustrate the different-spec linear feeder 17(C).

Description of structural details is hereinafter given to the different-spec linear feeder 17(C) that is suitable for use in transport of small quantities of sticky articles like small rice crackers or small fishes cooked in mirin.

The upstream linear feeder 17*a* of the different-spec linear feeder 17(C), which is illustrated in FIGS. 8(A), 8(B) and 9, has a trough 19*a* having a reversed trapezoidal shape in cross section. In this trough 19*a*, its bottom surface and side surfaces constituting the reversed trapezoidal shape form a transport path for the articles to be transported. In the transport path of this trough, a guiding protrusion 22 is formed at an intermediate position; a center position in this example, in the direction of width (lateral direction) relatively downstream in the direction of transport of articles. The guiding protrusion 22 serves to split and guide the articles being transported to lateral sides of the transport path in the direction of width.

The guiding protrusion 22 has a triangular shape in plan view elongated in the front-back direction and progressively greater in width in the direction of transport. The shape of this guiding protrusion 22 in side view is like a mountain linearly uprising by degrees in the direction of transport from the trough's bottom surface. The guiding protrusion 2 has, at a center position in the lateral direction, a ridge-like portion elongated in the front-back direction. The guiding protrusion 2 further has curved surfaces at sides in which the ridge-like portion is smoothly curved.

The guiding protrusion 22 provides, at its sides, transport passages "h" progressively narrower in the direction of transport. These transport passages "h" may preferably have, at the end of this guiding protrusion, a lateral width that allows two or three small fishes to pass through.

The downstream linear feeder 17*b* of the different-spec linear feeder 17(C) has a trough 19*a* having a reversed trapezoidal shape in cross section. This trough has a bottom surface bending like a stepwise slope directed downward in the direction of transport of articles. A transport passage "f" at the lowest level on the article-outgoing side of the trough 19*b* may have a small width only large enough to let through a row of articles, for example, a row of small fishes lined up with their heads or tails being directed forward.

The different-spec linear feeder 17(C) is configured to operate as described below. The articles supplied into and received by the upstream linear feeder 17*a* are vibrated and thereby transported forward. The articles being transported are then split by the guiding protrusion 22 to right and left and are thrown into the downstream linear feeder 17*b*. When, for example, the articles likely to stick together in a lump arrive at the guiding protrusion 22, the articles are guided to run over the guiding protrusion 22 and then vibrated and split onto two sides of this guiding protrusion. The articles may be thus split into smaller quantities and transported through narrow transport passages "h".

The articles transferred from the upstream linear feeder 17*a* into the downstream linear feeder 17*b* are subject to a certain drop impact due to a difference in height between these feeders 17*a* and 17*b*, which may allow the articles to easily split into pieces. The articles transported by the downstream linear feeder 17*b* drop through two differences in height "d" and may thereby easily split, and then arrive at a narrow, most downstream transport path "f". In this transport path "f", the articles may be lined up in a row and transported in a small quantity at a time, for example, one small fish at a time, into the supply hopper 6 of the weighing unit 4.

Thus, the guiding protrusion 22 formed in the trough 19*a* of the upstream linear feeder 17*a* may serve to split any articles likely to stick together in a lump, such as small fishes, onto two sides of the trough in the direction of width while the articles are being vibrationally transported. The articles, while travelling through the transport passages progressively narrower at sides of the guiding protrusion, may be thus split apart in small quantities at two sides of the trough in the direction of width and then transported in small quantities.

Under the drop impact generated at the time of the articles being transferred from the trough 19*a* of the upstream linear feeder 17*a* into the trough 19*b* of the downstream linear feeder 17*b*, any articles likely to stick together in a lump may be successfully split apart and smoothly transported. Thus, very small quantities of articles, even one each of small fishes at a time, may be successfully transported out of the trough 19*b* of the downstream linear feeder 17*b* into the supply hopper 6 of the weighing unit 4.

As illustrated in FIG. 5, the support table 18 of the article supplier 5 has a reject mechanism 50 disposed to discharge the articles oversupplied into and received by the weighing hopper 6.

The reject mechanism 50 includes a reject chute 51 allowed to horizontally move forward and backward, and a collection chute 52 and a collection container 53 used to collect the articles introduced into and received by the reject chute 51.

The reject chute 51 is disposed so as to face a first transport path (a) of the weighing hopper 7 from the outer front side. The reject chute 51 is driven by an air cylinder 54 to move toward and away from the first transport path (a). At normal times, the reject chute 51 retreats to and stays at a position on the outer side of the first transport path (a), as illustrated in FIG. 5. Thus, the reject chute 51 may be prevented at normal times from interfering with discharge of the articles into the first collection chute 9 after the outer gate 7*a* of the weighing hopper 7 is opened.

In case a weight value measured by the weighing hopper 7 suggests an oversupply of the articles inappropriate for the combinatorial computations, the reject chute 51 moves to and stays on the first transport path (a), which is REJECT status. When the outer gate 7a of the weighing hopper 7 is opened during the REJECT status, the articles in excess in the weighing hopper 7 are discharged into the reject chute 51 and dropped downward into the collection container 53 through the collection chute 52. After the articles are thus collected, the reject chute 51 moves to the original position away from the first transport path (a), and the weighing hopper 7, with the outer gate 7a being closed, is ready for the next combinatorial computations.

The reject chute 51 has, at its edge, a guide member 55 made of a plate material. The guide member 55 is at a position facing the first transport path (a) from the outer side when the reject chute 51 is retreated to and staying at the position on the outer side of the first transport path (a). At this position, the guide member 55 prevents the articles from flying off outward that are discharged from the weighing hopper 7 when the outer gate 7a is opened, so that the articles are properly guided into the first collection chute 9.

OTHER EMBODIMENTS

The present invention may be feasible as described below.

Figure 14:
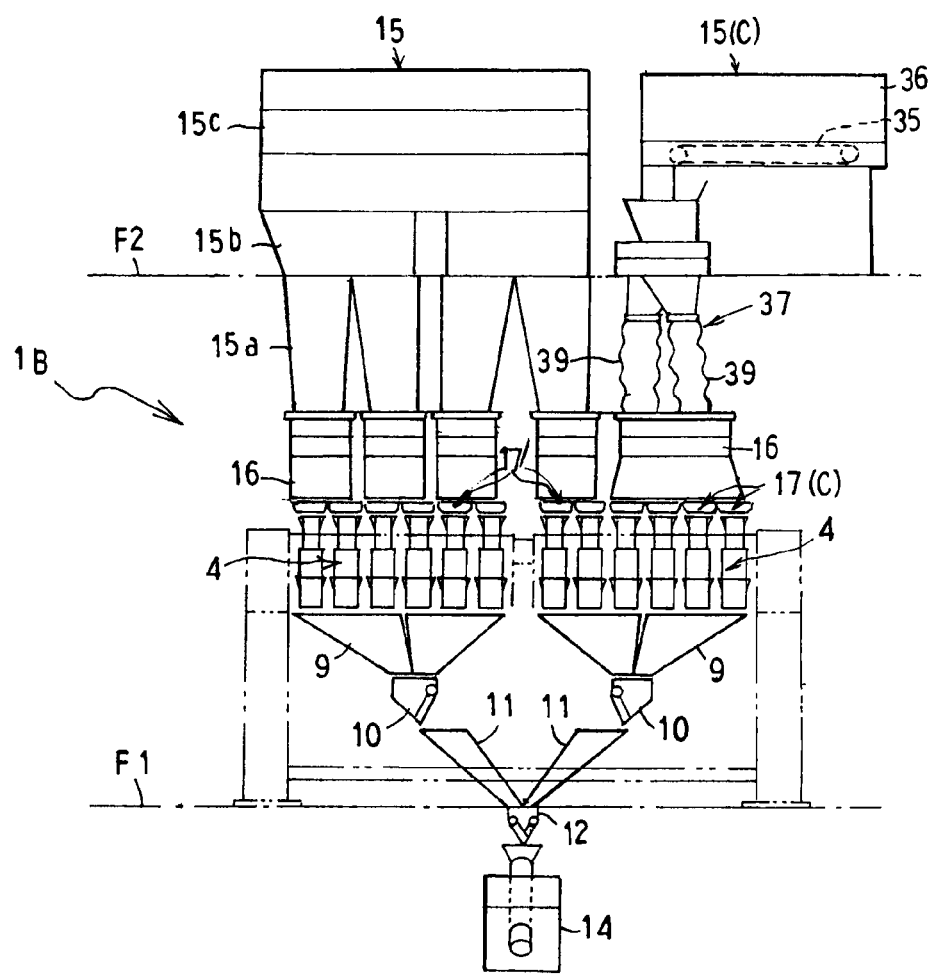
FIG. 14 is a schematic front view of a weighing device according to another embodiment of the present invention.

1) As illustrated in FIG. 14, the article split-and-guide member 37 may be a plurality of plastic ducts 39 that comply with the standards for food safety and hygiene. The plastic ducts 39 are arranged next to each other and used to disperse and guide the articles to flow downward into a plurality of places in the retaining hopper 16.

2) In the earlier embodiment, the articles are first split into two places by the article split-and-guide member 37 before the articles are dispersedly supplied into the four article suppliers (linear feeders) 17 arranged next to one another. In case more than four article suppliers 17, for example, six article suppliers 17 arranged next to each other are used and supplied with the same type of articles, the articles to be supplied may be split by the article split-and-guide member into, for example, three places.

3) The article supplier that transports the articles widely may be a stock feeder instead of the belt conveyer described herein.

REFERENCE SIGNS LIST 4 weighing unit
15a lower-stage tank
16 retaining hopper
17 linear feeder (article supplier)
35 belt conveyer (article transporter)
36 upper tank
37 article split-and-guide member
38 split funnel

The invention claimed is:

1. A combination weighing device, comprising:
a plurality of article suppliers disposed in juxtaposition with each other, the plurality of article suppliers being adapted to transport and supply articles to a plurality of weighing units;
an article transporter adapted to transport the articles from a direction intersecting with a direction of transport of the articles by the plurality of article suppliers, the article transporter being further adapted to drop and discharge the articles from above the plurality of article suppliers;
an article split-and-guide member adapted to drop and guide the articles discharged from an article-outgoing end of the article transporter in a manner that the articles split into a plurality of places in a direction of juxtaposition of the plurality of article suppliers; and
a retaining hopper at a position below the article split-and-guide member, the retaining hopper being adapted to introduce the articles guided to flow downward by the article split-and-guide member into the plurality of article suppliers.

2. The combination weighing device according to claim 1, wherein
the direction intersecting with the direction of transport is a direction orthogonal to the direction of transport, and
the article transporter drops and discharges the articles from the article-outgoing end having a certain width.

3. The combination weighing device according to claim 1 or 2, wherein
the article split-and-guide member comprises a plurality of split funnels arranged in adjacency to each other, and
discharged positions of the plurality of split funnels at lower ends thereof are displaced from each other in the direction of juxtaposition.

4. The combination weighing device according to claim 3, wherein
the plurality of article suppliers are linear feeders.

5. The combination weighing device according to claim 1 or 2, wherein
the article transporter comprises:
an upper tank having a cylindrical shape; and
a belt conveyor disposed below the upper tank, the belt conveyor being adapted to transport and drop the articles downward to be discharged.

6. The combination weighing device according to claim 1 or 2, wherein the article split-and-guide member is housed in a housing tank having a cylindrical shape.

* * * * *